US012000193B2

(12) United States Patent
Wu et al.

(10) Patent No.: US 12,000,193 B2
(45) Date of Patent: Jun. 4, 2024

(54) ELECTRIC SUPPORTING ROD

(71) Applicants: HSIN CHONG MACHINERY WORKS CO. LTD., Taoyuan (TW); FUZHOU MINGFANG AUTOMOBILE PARTS INDUSTRY CO., LTD., Fuzhou (CN)

(72) Inventors: Chi-Wang Wu, Taoyuan (TW); Feng-Lin Yang, Taoyuan (TW); Jeffrey Chung-Chiang Hsi, Taoyuan (TW)

(73) Assignees: HSIN CHONG MACHINERY WORKS CO. LTD., Taoyuan (TW); FUZHOU MINGFANG AUTOMOBILE PARTS INDUSTRY CO., LTD., Fuzhou (CN)

( * ) Notice: Subject to any disclaimer, the term of this patent is extended or adjusted under 35 U.S.C. 154(b) by 0 days.

(21) Appl. No.: 17/684,404

(22) Filed: Mar. 1, 2022

(65) Prior Publication Data

US 2023/0279715 A1 Sep. 7, 2023

(51) Int. Cl.
*E05F 15/622* (2015.01)

(52) U.S. Cl.
CPC ....... *E05F 15/622* (2015.01); *E05Y 2201/434* (2013.01); *E05Y 2201/71* (2013.01)

(58) Field of Classification Search
CPC ...... E05F 15/603; E05F 15/611; E05F 15/622
See application file for complete search history.

(56) References Cited

U.S. PATENT DOCUMENTS

| | | | | |
|---|---|---|---|---|
| 6,772,653 | B1 | 8/2004 | Franksson | |
| 10,745,958 | B2 | 8/2020 | Yamagata et al. | |
| 2003/0233901 | A1* | 12/2003 | Schuda | E05F 15/622 74/458 |

(Continued)

FOREIGN PATENT DOCUMENTS

| | | | |
|---|---|---|---|
| CN | 107923210 A | 4/2018 | |
| TW | M626062 U | 4/2022 | |
| WO | 2022200508 A1 | 9/2022 | |

OTHER PUBLICATIONS

Office Action dated Jul. 20, 2022 of the corresponding Taiwan patent application No. 110148247.

(Continued)

*Primary Examiner* — Gregory J Strimbu
(74) *Attorney, Agent, or Firm* — Chun-Ming Shih; HDLS IPR SERVICES

(57) ABSTRACT

An electric supporting rod includes a driving unit and an actuating unit. The driving unit has a first outer cylinder and a driver disposed in the first outer cylinder. The first outer cylinder has an opening and elastic latching hooks disposed on an inner wall thereof, and the driver has a transmission slot. The actuating unit has a second outer cylinder and a transmission screw rod sheathed in the second outer cylinder. The second outer cylinder has an insertion part inserted into the opening, the transmission screw rod has a passive end engaged with the transmission slot, the insertion part has connection pieces surrounding the passive end, and the connection pieces are latched with the elastic latching hooks (Continued)

to longitudinally lock driving unit and the actuating unit. Accordingly, the electric supporting rod has a simple structure and is easily assembled.

9 Claims, 12 Drawing Sheets

(56) References Cited

U.S. PATENT DOCUMENTS

| | | | | |
|---|---|---|---|---|
| 2010/0186528 | A1 | 7/2010 | Hillen et al. | |
| 2016/0144694 | A1* | 5/2016 | Shchokin | B60J 5/107<br>475/331 |
| 2017/0145727 | A1* | 5/2017 | Yamagata | F16H 25/20 |
| 2017/0191553 | A1* | 7/2017 | Heiberger | E05F 1/105 |
| 2020/0332584 | A1* | 10/2020 | Keßler | H02K 7/10 |
| 2020/0332585 | A1* | 10/2020 | Kummer | F16H 25/20 |
| 2022/0307583 | A1* | 9/2022 | Hisai | F16H 57/021 |
| 2023/0090696 | A1* | 3/2023 | Dörnen | F16D 7/021 |

OTHER PUBLICATIONS

Office Action dated Jan. 30, 2023 of the corresponding Taiwan patent application No. 110148247.
Search report dated Nov. 17, 2022 of the corresponding European patent application No. 22177149.6.

* cited by examiner

ELECTRIC SUPPORTING ROD

BACKGROUND OF THE DISCLOSURE

Technical Field

The present disclosure relates to an electric supporting rod, particularly to an electric supporting rod having advantages of simple in structure, easy to be assembled and capable of preventing an actuating unit from being driven to rotate.

Description of Related Art

With the rapid development of vehicle industry, an electric door has been commonly adopted because the electric door is convenient in operation. A related-art electric door utilizes electric supporting rods disposed at a left side and a right side thereof for supporting, and an electric motor disposed therein is used for performing a retracting adjustment for a length of a retractable screw rod disposed in electric supporting rod, thus an effect of opening or closing the electric door may be achieved.

An outer case of the electric supporting rod is mostly designed as two segments to make the electric motor and the retractable screw rod be correspondingly disposed in two outer cases, and the two outer cases are assembled to make the electric motor and the retractable screw rod be connected for transmitting power. However, for preventing the outer case where the retractable screw rod is disposed from being driven to rotate during the operation, a fastening unit is additionally disposed for a purpose of positioning. As such, the related-art electric supporting rod has disadvantages of complicated in structure, uneasy in assembly and requiring a high production cost.

Accordingly, the applicant of the present disclosure has devoted himself for improving the mentioned disadvantages.

SUMMARY OF THE DISCLOSURE

The present disclosure is to provide an electric supporting rod having advantages of simply in structure, easy to be assembled and lowering the production cost.

Accordingly, the present disclosure provides an electric supporting rod including a driving unit and an actuating unit. The driving unit has a first outer cylinder and a driver disposed in the first outer cylinder, an opening is defined on one end of the first outer cylinder, the driver has a transmission slot formed on one end facing the opening, and a plurality of elastic latching hooks are convexly disposed on an inner wall of the first outer cylinder and located between the opening and the transmission slot. The actuating unit has a second outer cylinder and a transmission screw rod sheathed in the second outer cylinder, an insertion part is disposed on one end of the second outer cylinder, the transmission screw rod has a passive end protruding from the insertion part, and the insertion part is extended with a plurality of connection pieces surrounding the passive end. The insertion part is inserted in the opening, the passive end is engaged with the transmission slot, and each of the connection pieces is latched with each of the elastic latching hooks to longitudinally lock driving unit and the actuating unit.

Advantages achieved by the present disclosure are as follows. The driving unit may be fastened on a vehicle frame or a door frame via a connector. The actuating unit may be fastened on the door frame or the vehicle frame via a fasten hole of a rotary connector. Inner reverse hooks formed at an inner edge of the connection piece and the insertion part jointly clamp a bearing to allow a central location of transmission screw rod to be kept. With positioning columns being correspondingly inserted in positioning holes to achieve a positioning effect, the second outer cylinder may be prevented from being driven to rotate when the driver drives the transmission screw rod to rotate.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE DISCLOSURE

Figure 1:
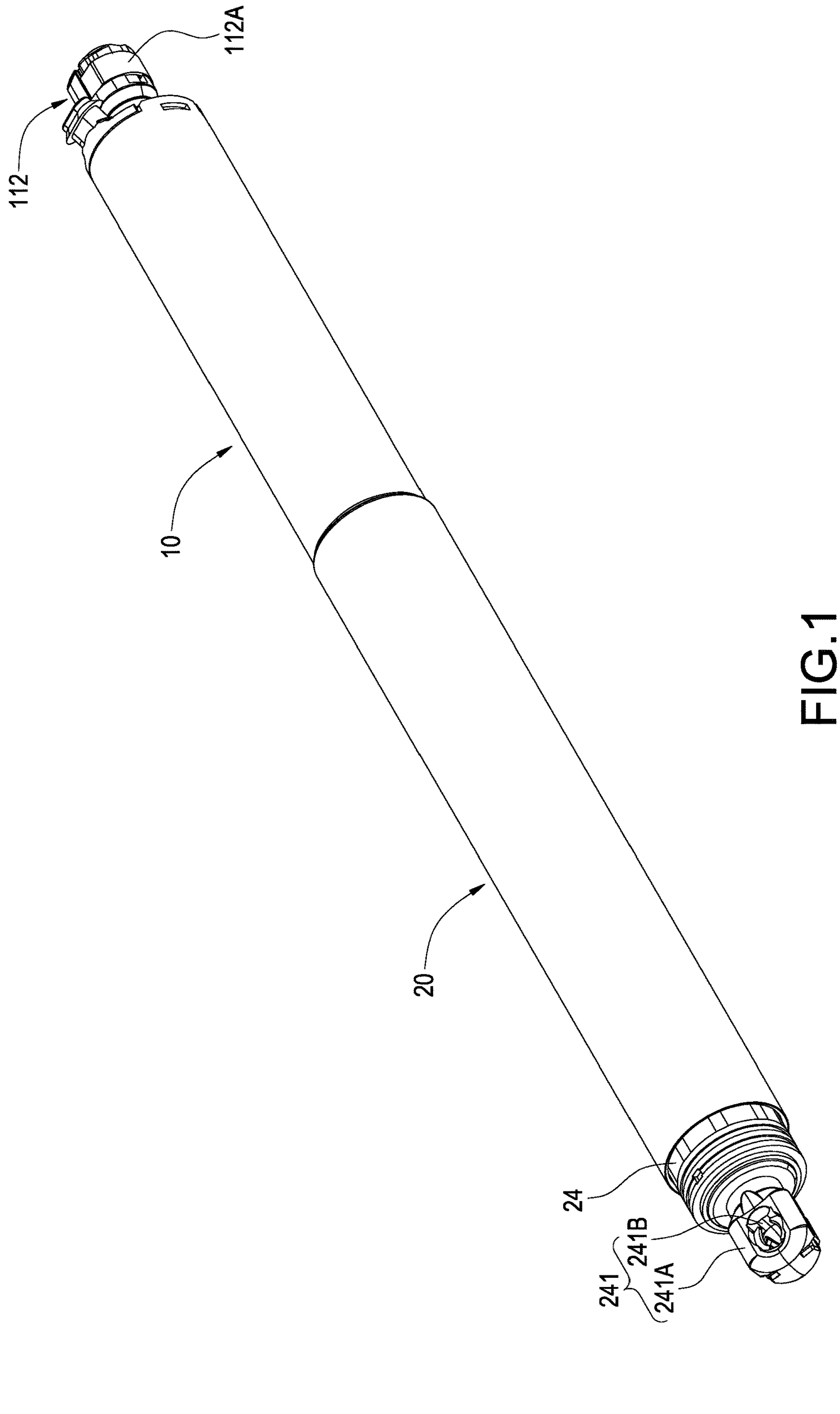
FIG. 1 is a perspective view showing the assembly according to the present disclosure.

The technical contents of this disclosure will become apparent with the detailed description of embodiments accompanied with the illustration of related drawings as follows. It is intended that the embodiments and drawings disclosed herein are to be considered illustrative rather than restrictive.

The present disclosure provides an electric supporting rod, which is used for opening or closing an electric door of a vehicle and supporting the electric door. Please refer from FIG. 1 to FIG. 4, the electric supporting rod mainly includes a driving unit 10 and an actuating unit 20.

The driving unit 10 mainly includes a first outer cylinder 11 and a driver 12. The first outer cylinder 11 is a hollow cylindrical body, an opening 111 is defined on one end of the first outer cylinder 11, and a connection part 112 is formed on another end of the first outer cylinder 11 away from the opening 111. The connection part 112 has a connector 112A used for fastening the driving unit 10 on a vehicle frame or a door frame. In some embodiments, the driver 12 is an electric motor, but here is not intended to be limiting. The driver 12 is disposed in the first outer cylinder 11, the driver

12 has a transmission slot 121 on one end facing the opening 111, and a plurality of inner teeth 121A are formed on an inner edge of the transmission slot 121. A plurality of elastic latching hooks 113 are convexly disposed on an inner wall of the first outer cylinder 11 and located between the opening 111 and the transmission slot 121 of the driver 12. The actuating unit 20 mainly includes a second outer cylinder 21 and a transmission screw rod 22. The second outer cylinder 21 is a hollow cylindrical body, and an insertion part 211 is disposed on one end of the second outer cylinder 21 corresponding to the opening 111 of the first outer cylinder 11. The transmission screw rod 22 is received in the second outer cylinder 21, and has a passive end 221 protruding from the insertion part 211, and a plurality of outer teeth 221A engaged with each of the inner teeth 121A are formed on an outer edge of the passive end 221. The insertion part 211 is longitudinally extended with a plurality of connection pieces 212 corresponding to each of the elastic latching hooks 113, and each of the connection pieces 212 is annularly disposed at an outer periphery of the passive end 221. In some embodiments, the actuating unit 20 further includes a bearing 23. The bearing 23 is adapted to sheathe the transmission screw rod 22, and a plurality of inner reverse hooks 212A are concavely disposed on an inner edge of each of the connection pieces 212. Each of the inner reverse hooks 212A and the insertion part 211 jointly clamp and fasten the bearing 23 to allow a central location of transmission screw rod 22 to be kept.

Details are provided as follows. The actuating unit 20 further includes a moveable inner cylinder 24. The moveable inner cylinder 24 is moveably disposed in the second outer cylinder 21, and the moveable inner cylinder 24 is engaged with and connected to the transmission screw rod 22 to make the transmission screw rod 22 drive the moveable inner cylinder 24 to retractably move relative to the second outer cylinder 21. The moveable inner cylinder 24 has a fasten end 241 exposed outside the second outer cylinder 21. The fasten end 241 has a rotary connector 241A, and the rotary connector 241A has a fasten hole 241B to fasten the actuating unit 20 on the door frame or the vehicle frame.

Figure 2:
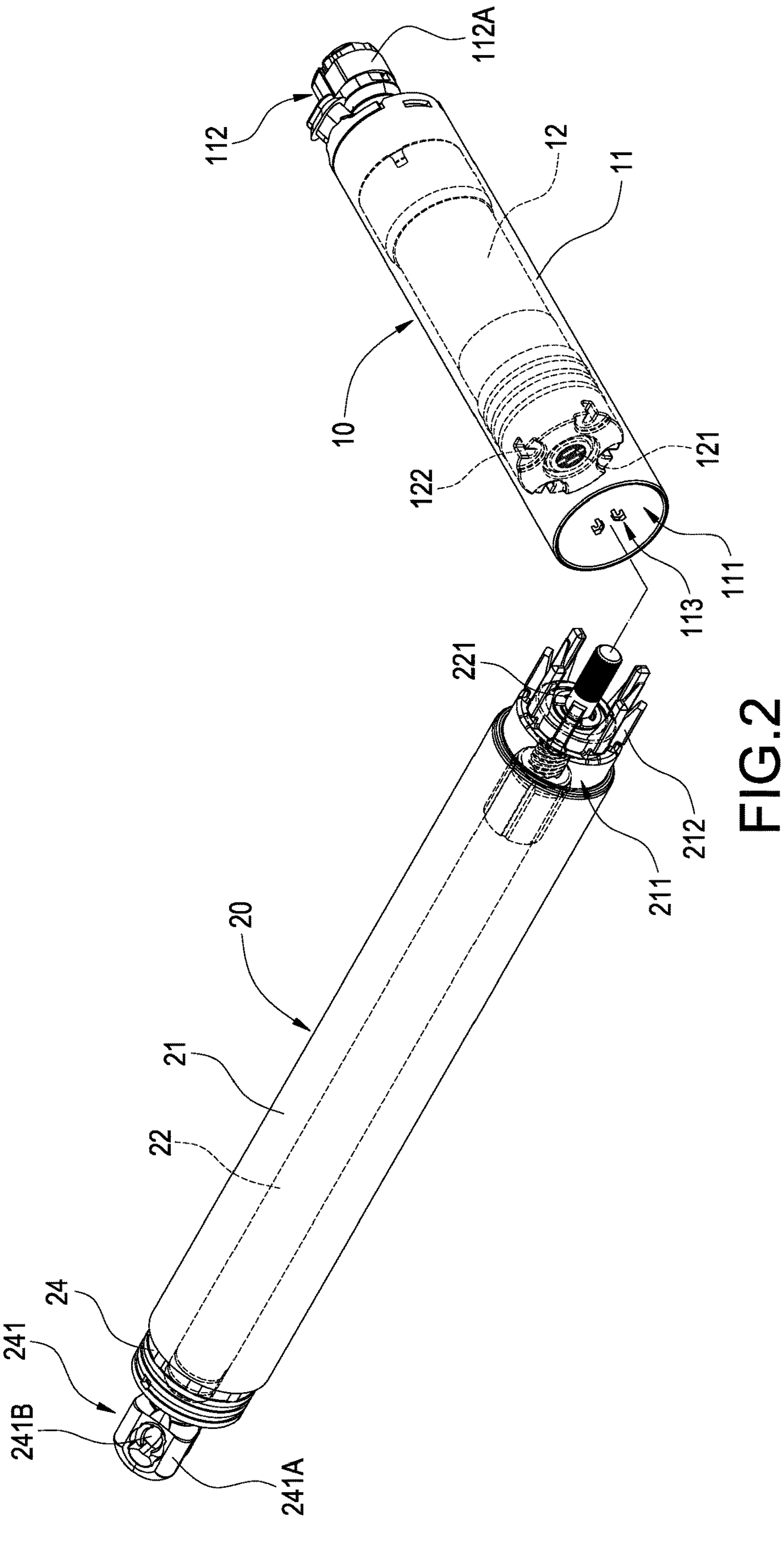
FIG. 2 is a perspective exploded view according to the present disclosure.
Figure 3:
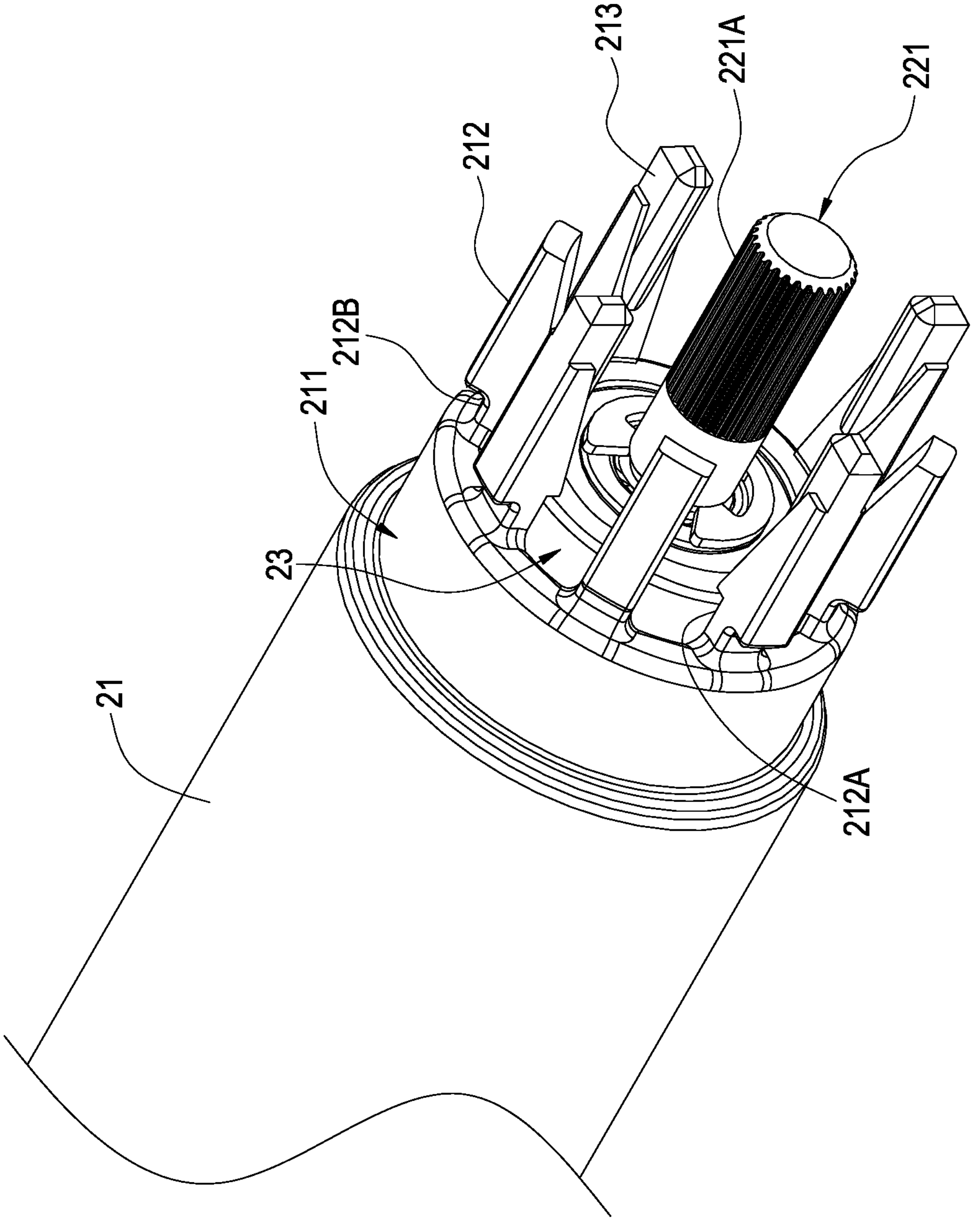
FIG. 3 is a partially enlarged view showing the insertion end according to the present disclosure.
Figure 4:
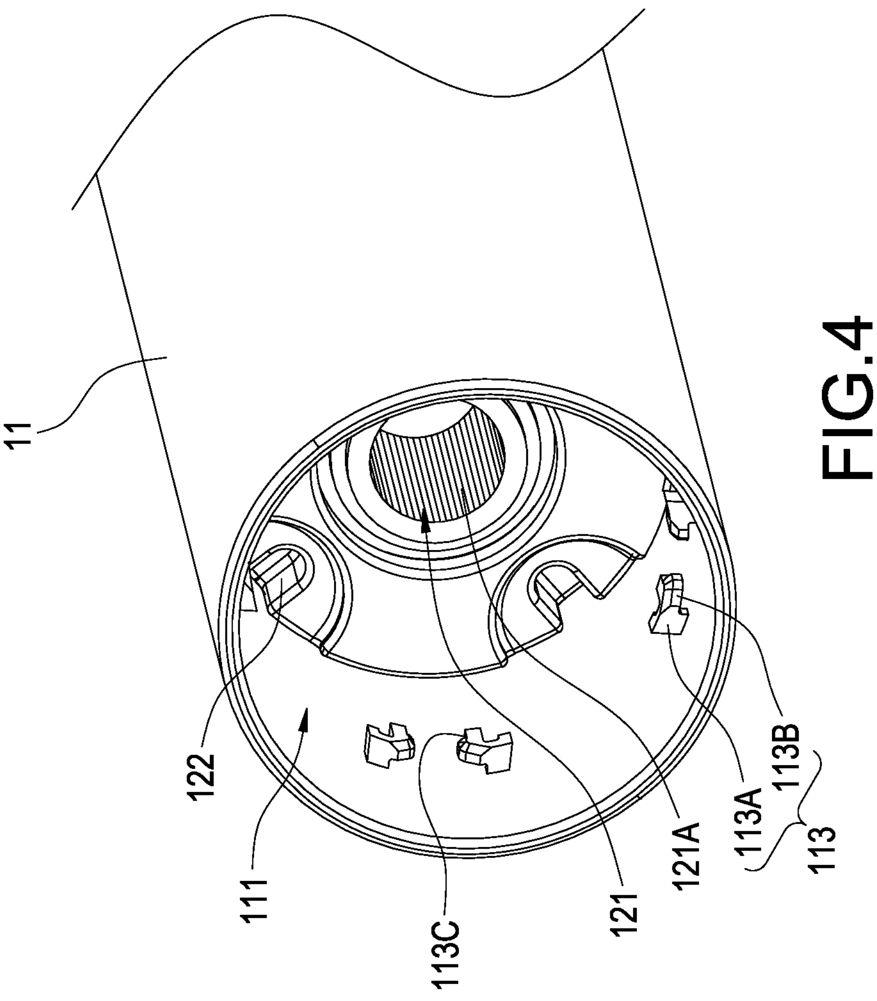
FIG. 4 is a partially enlarged view showing the opening according to the present disclosure.

Please refer to FIG. 1 and FIG. 2, the actuating unit 20 is connected to the driving unit 10. In some embodiments, the insertion part 211 of the second outer cylinder 21 is inserted to the opening 111 of the first outer cylinder 11, thus the passive end 221 of the transmission screw rod 22 may be engaged with the transmission slot 121 of the driver 12, and each of the connection pieces 212 is correspondingly hooked with each of the elastic latching hooks 113 to longitudinally lock the driving unit 10 and the actuating unit 20. As such, a connecting and fastening relation may be achieved between the driving unit 10 and the actuating unit 20, the transmission slot 121 of the driver 12 and the passive end 221 of the transmission screw rod 22 are connected for transmitting power, thus the driver 12 drives the transmission screw rod 22 to rotate to make the moveable inner cylinder 24 retractably move.

Details are provided as follows. Each of the elastic latching hooks 113 has a base part 113A and an elastic arm 113B. Each of the base parts 113A is disposed on the inner wall of the first outer cylinder 11, and respectively connected to each of the corresponding elastic arms 113B. Each of the elastic arms 113B is concavely formed with a hook part 113C. An outer reverse hook 212B is disposed on an outer edge of each of the connection pieces 212. Each of the hook parts 113C is correspondingly hooked with each of the outer reverse hooks 212B to longitudinally block each of the connection pieces 212. In some embodiments, every two of the elastic latching hooks 113 are defined as a set to latch one of the corresponding connection pieces 212 (in other words, the amount of the elastic latching hooks 113 is double comparing to the amount of the connection pieces 212), the two elastic latching hooks 113 defined as the set are oppositely disposed, thus the hook parts 113C of the two elastic arms 113B are jointly latched with the outer reverse hook 212B of the corresponding connection piece 212. The present disclosure is not intended to be limiting, for example there are elastic latching hooks 113 as many as the connection pieces 212 as long as a latching and restraining effect may be effectively provided.

The insertion part 211 of the second outer cylinder 21 is further extended with a plurality of positioning columns 213, and the driver 12 is concavely formed with a plurality of positioning holes 122 surrounding the transmission slot 121. In some embodiments, each of the positioning columns 213 and each of the connection pieces 212 are arranged at intervals, but here is not intended to be limiting. Each of the positioning columns 213 is respectively inserted in each of the corresponding positioning holes 122 to achieve a positioning effect. As such, when the transmission slot 121 of the driver 12 drives the transmission screw rod 22 to rotate, the second outer cylinder 21 of the actuating unit 20 may be prevented from being driven to rotate. In some embodiments, there are four positioning columns 213, but here is not intended to be limiting. For example there may be two, three, four or more than four of positioning columns 213, as long as the positioning effect may be achieved and a rotating situation may be prevented.

Figure 5:
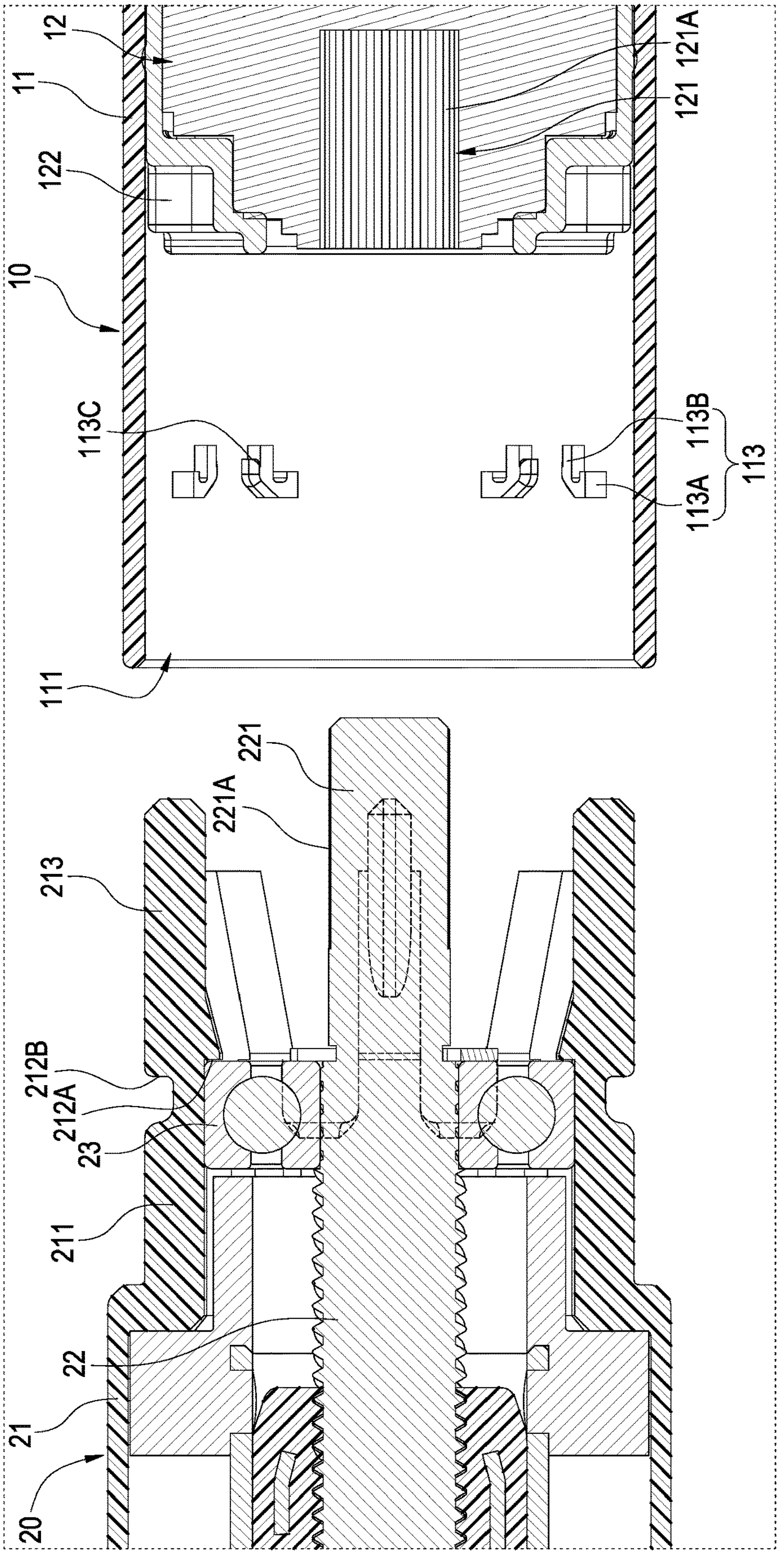
FIG. 5 and FIG. 6 are two different cross sectional views in partial showing a status before the actuating unit and the driving unit are assembled according to the present disclosure.
Figure 6:
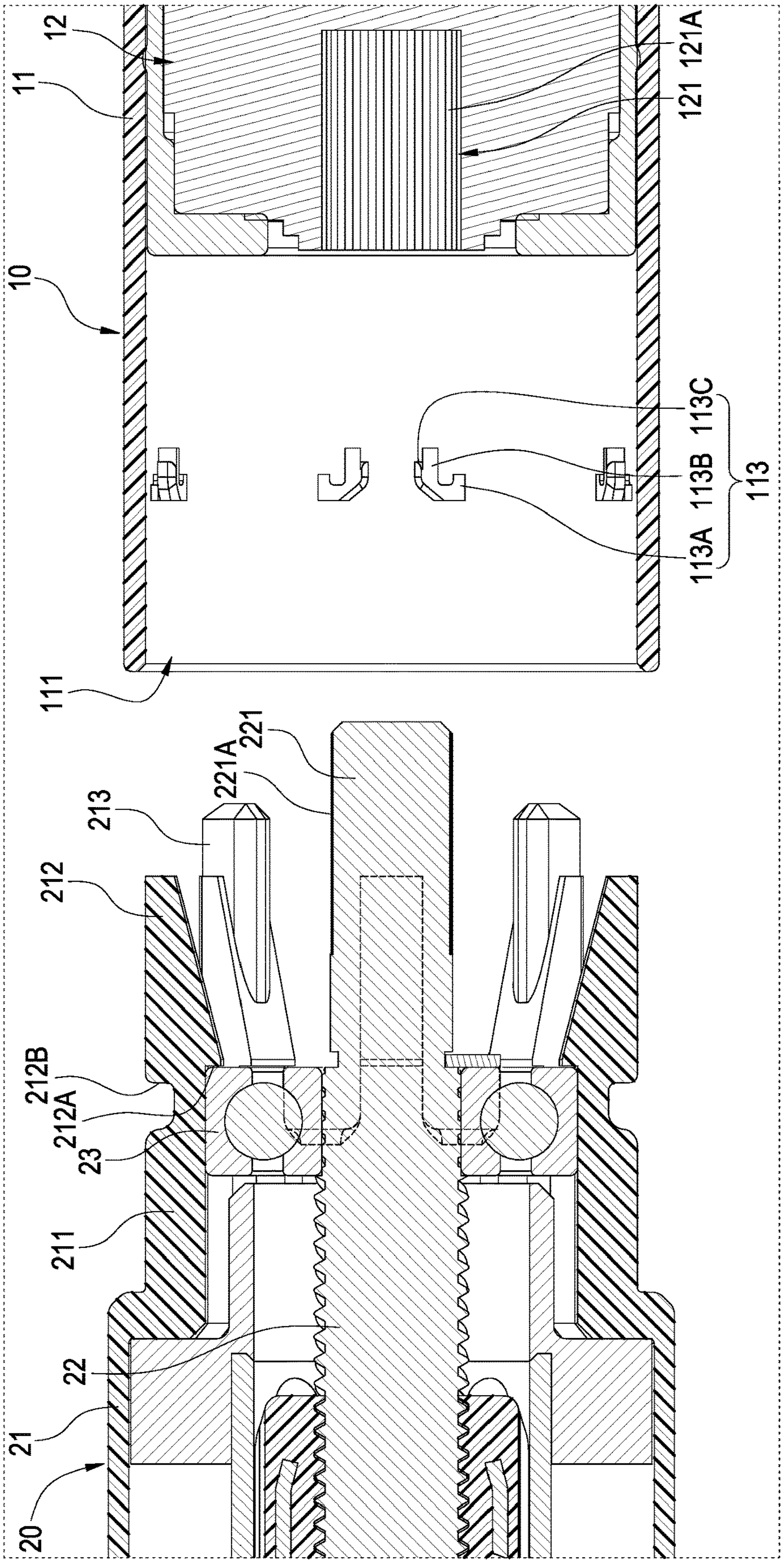
Figure 7:
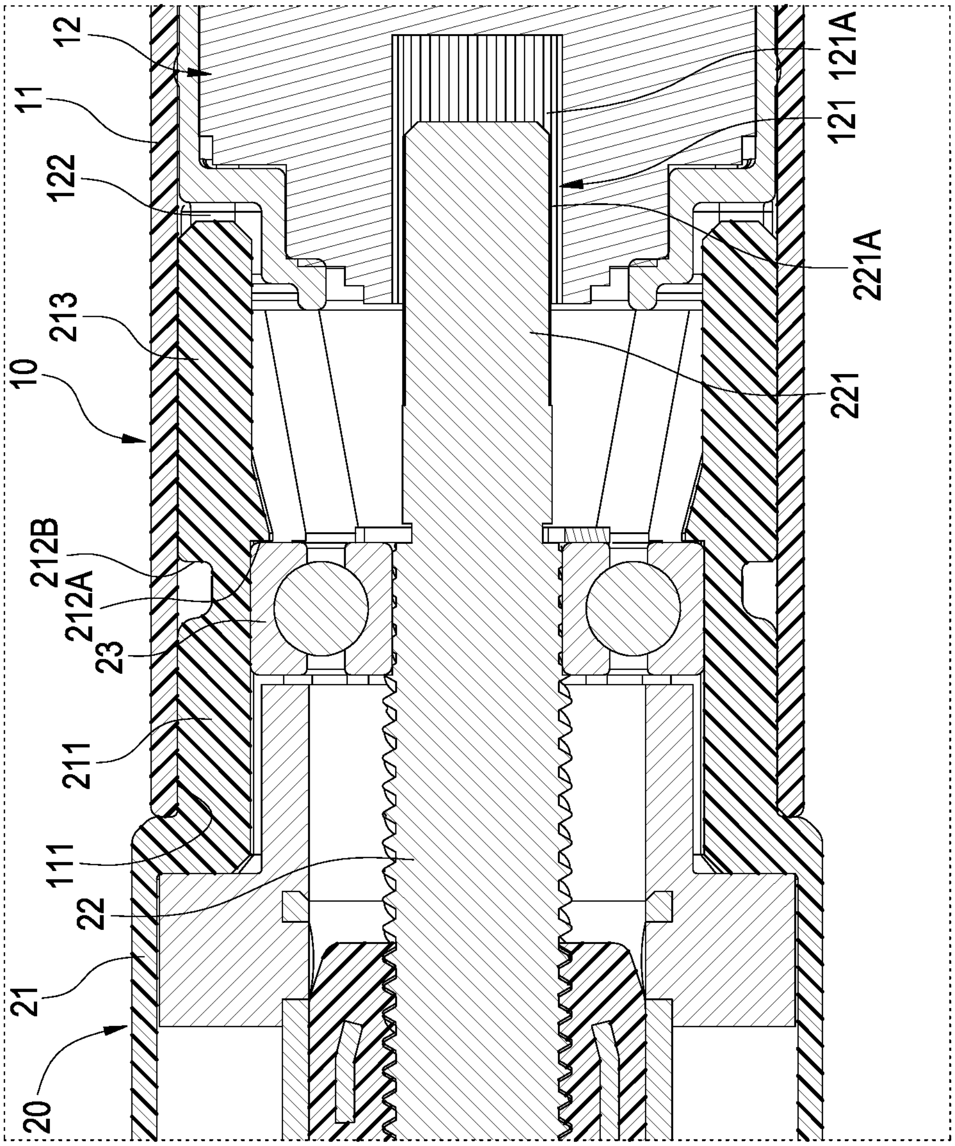
FIG. 7 and FIG. 8 respectively show a status after the actuating unit and the driving unit are assembled in FIG. 5 and FIG. 6.
Figure 8:
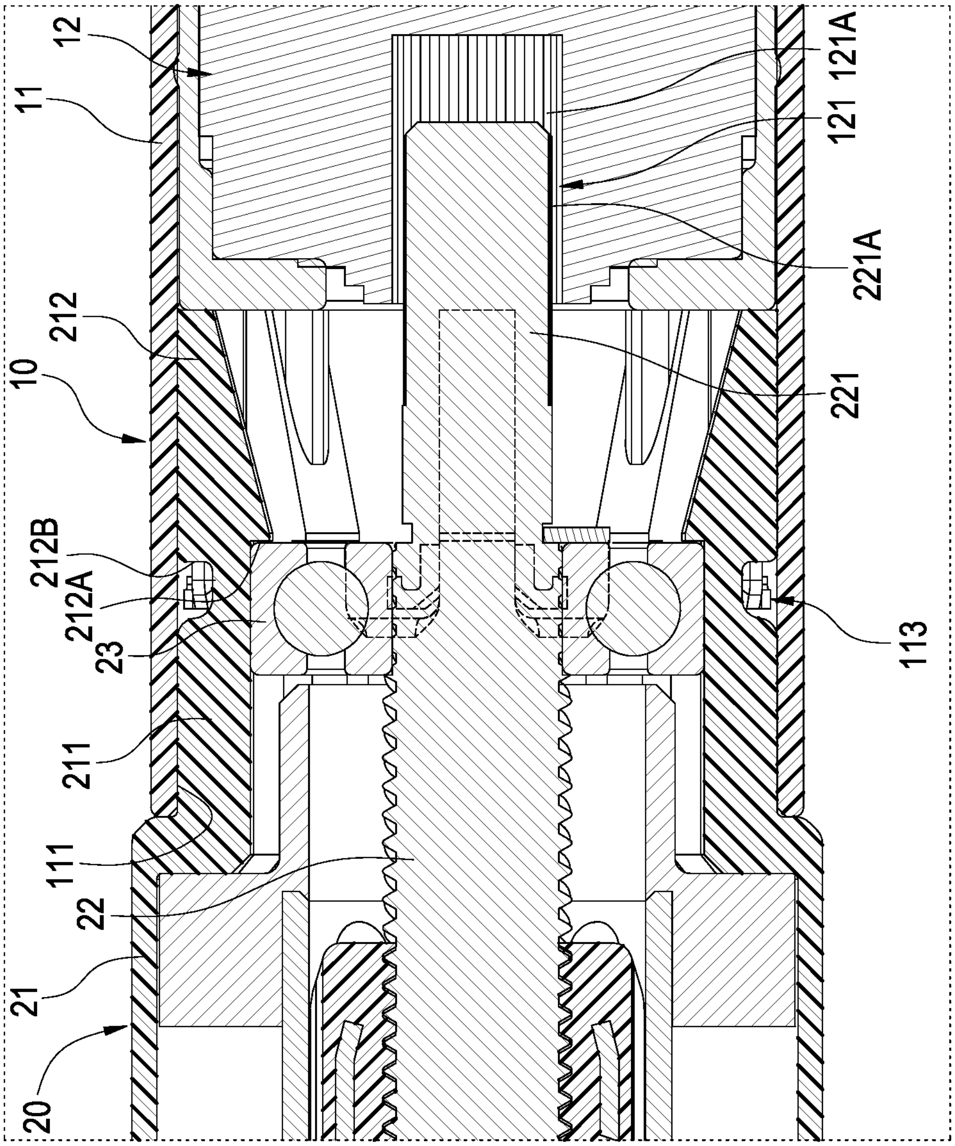
Figure 9:
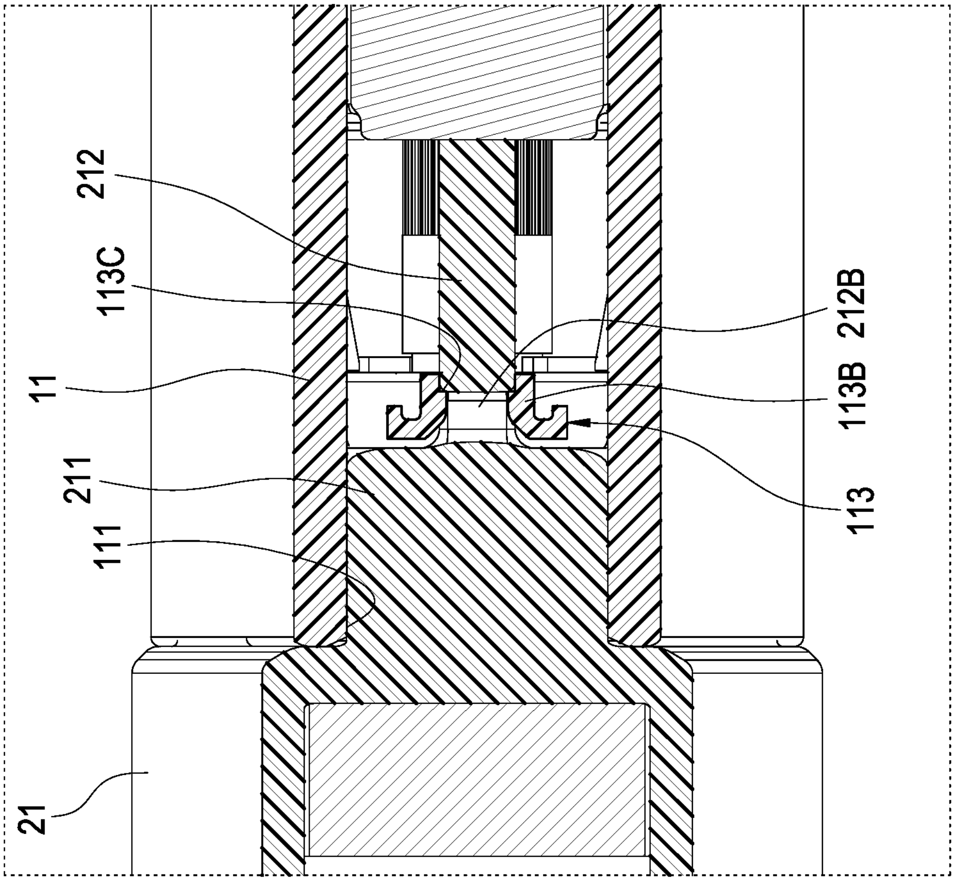
FIG. 9 shows another cross-sectional view of FIG. 7 and FIG. 8.

Please refer from FIG. 5 to FIG. 9, which are schematic views showing the actuating unit and the driving unit 10 being assembled. Firstly, please refer to FIG. 5 and FIG. 6, before the actuating unit 20 and the driving unit 10 are assembled, the passive end 221 of the transmission screw rod 22 is aligned with the transmission slot 121 of the driver 12, and each of the positioning columns 213 is correspondingly aligned with each of the positioning holes 122 as shown in FIG. 5, and then each of the connection pieces 212 is correspondingly aligned with each of the elastic latching hooks 113 as shown in FIG. 6. When the insertion part 211 is inserted in the opening 111, each of the connection pieces 212 pushes a top end and a bottom end of the two corresponding elastic arms 113B (not shown in figures), thus each of the connection pieces 212 may be inserted between the two sets of corresponding elastic latching hooks 113. Please refer from FIG. 7 to FIG. 9, when the actuating unit 20 is inserted and positioned, the insertion part 211 of the second outer cylinder 21 is latched in the opening 111 of the first outer cylinder 11, the passive end 221 of the transmission screw rod 22 is engaged with the transmission slot 121 of the driver 12, and each of the positioning columns 213 is correspondingly inserted in each of the positioning holes 122 to prevent the second outer cylinder 21 from rotating as shown in FIG. 7. The outer reverse hook 212B of each of the connection pieces 212 is latched and blocked by the hook parts 113C of the two corresponding elastic arms 113B as shown in FIG. 8 and FIG. 9, thus the actuating unit 20 and the driving unit may be longitudinally locked and assembled.

Figure 10:
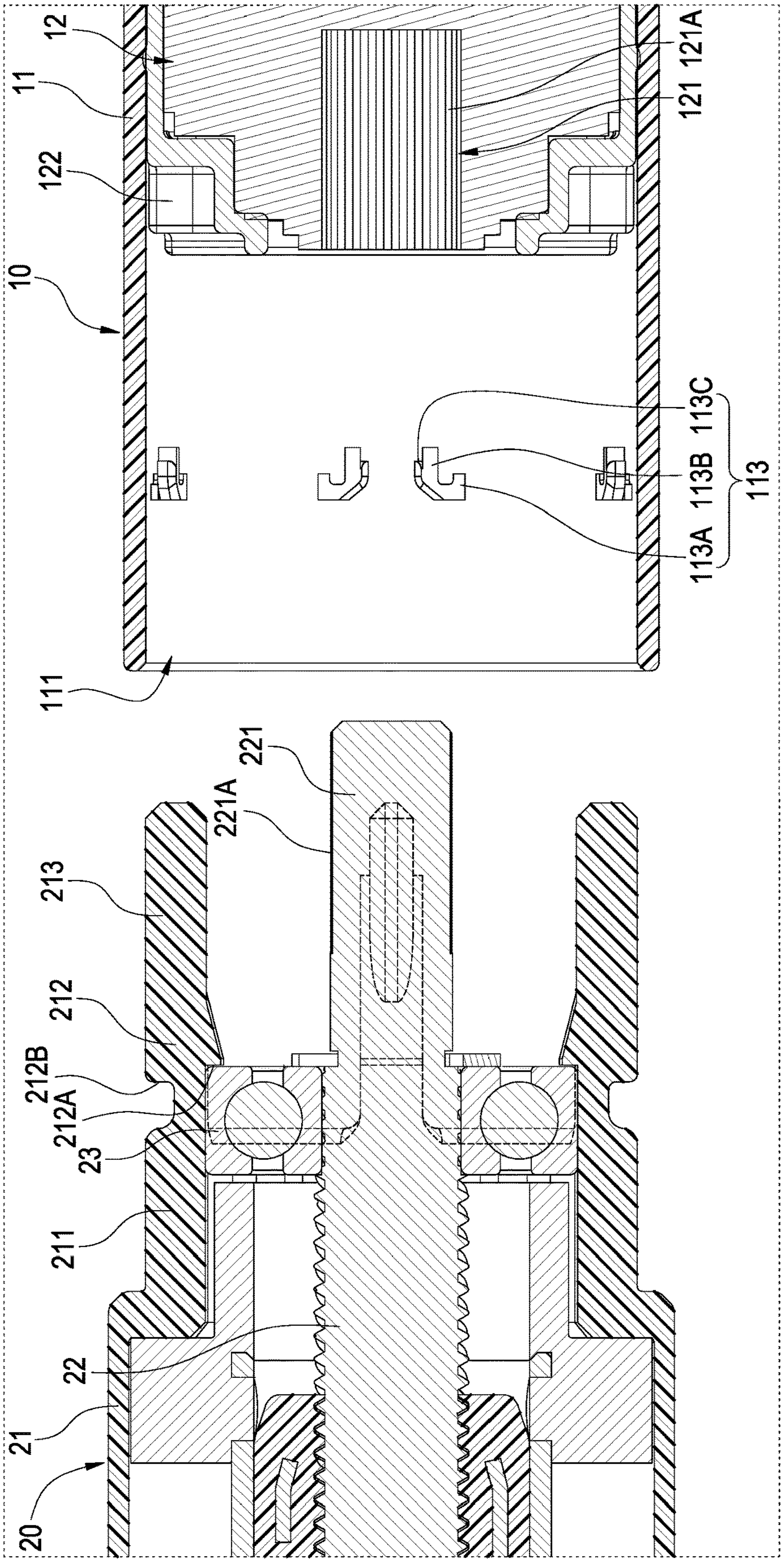
FIG. 10 is a cross sectional view in partial showing a status before the actuating unit and the driving unit are assembled according to another embodiment of the present disclosure.
Figure 11:
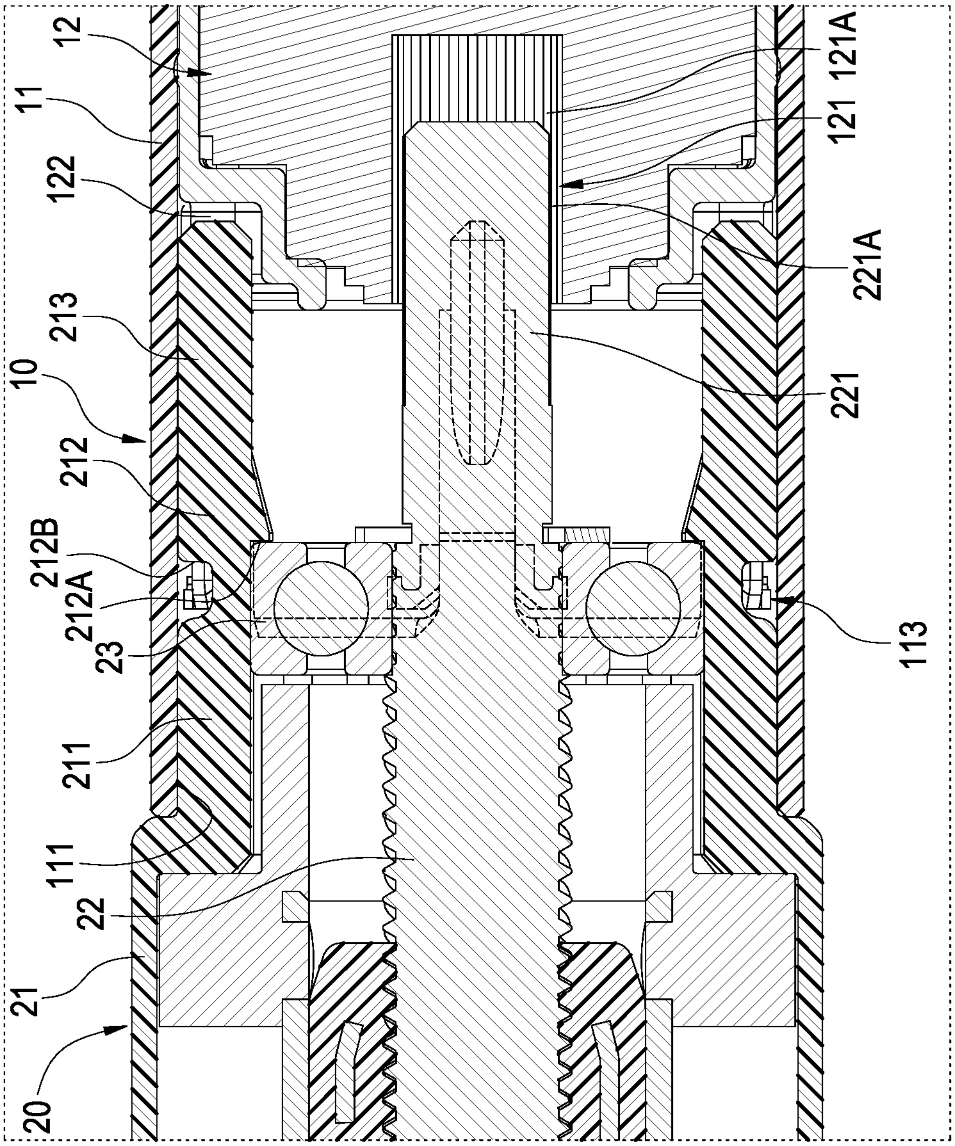
FIG. 11 shows a status after the actuating unit and the driving unit are assembled in FIG. 10.
Figure 12:
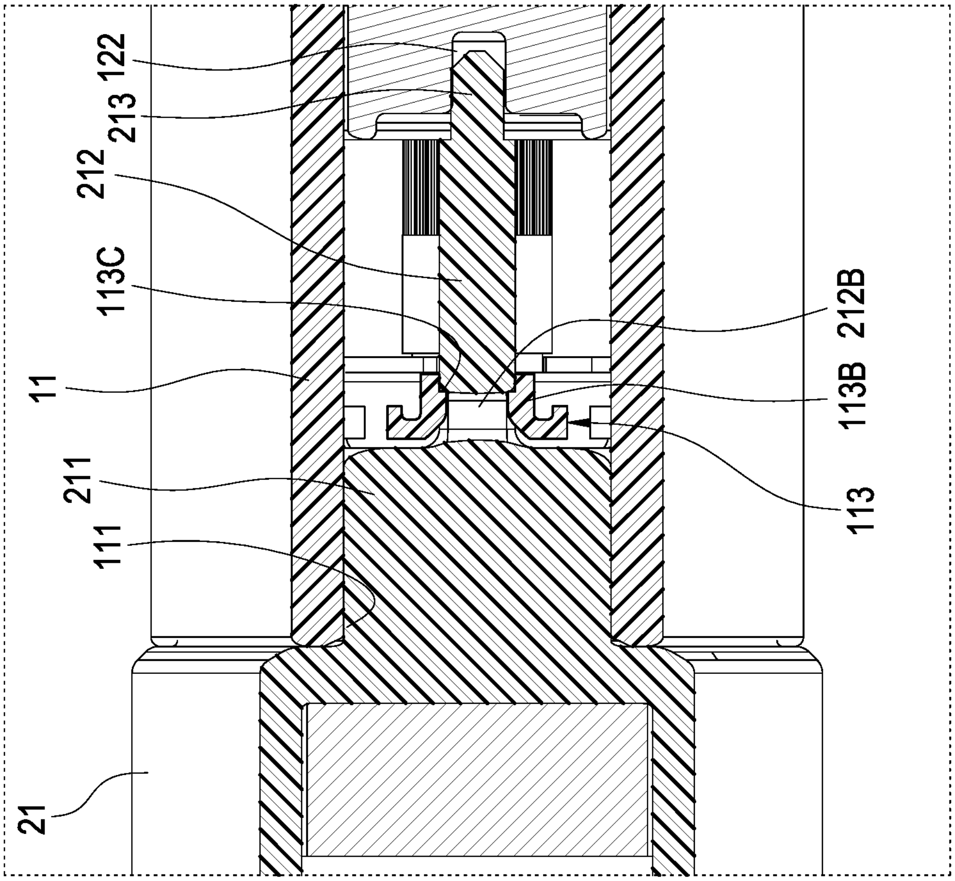
FIG. 12 shows another cross-sectional view of FIG. 11.

Please refer from FIG. 10 to FIG. 12, which disclose a second embodiment of the present disclosure, a difference between the first embodiment and the second embodiment is that each of the positioning columns 213 is extended to a distal end of each of the connection pieces 212, and each of the connection pieces 212 and the corresponding positioning column 213 and the corresponding positioning hole 122 may be aligned on the same linear line. Please refer to FIG. 10, before the actuating unit 20 and the driving unit 10 are assembled, the passive end 221 of the transmission screw rod 22 is aligned with the transmission slot 121 of the driver 12, each of the positioning columns 213 is aligned with each of the positioning holes 122. Because the connection pin 212, the corresponding positioning column 213 and the corresponding positioning hole 122 are aligned on the same linear line, each of the connection pieces 212 is aligned with each of the corresponding elastic latching hooks 113. Please refer to FIG. 11 and FIG. 12, after the actuating unit 20 is assembled with the driving unit 10, the outer reverse hook 212B of each of the connection pieces 212 is latched and blocked by the hook parts 113C of the two corresponding elastic arms 113B, and each of the positioning columns 213 located at the front may be inserted in each of the corresponding positioning holes 122. Accordingly, the design provided by the second embodiment may effectively simplify the whole structure, reduce the assembly error and lower the production cost, and the same technical feature provided in the first embodiment may be kept.

While this disclosure has been described by means of specific embodiments, numerous modifications and variations could be made thereto by those skilled in the art without departing from the scope and spirit of this disclosure set forth in the claims.

What is claimed is:

1. An electric supporting rod, comprising:

a driving unit, comprising a first outer cylinder and a driver disposed in the first outer cylinder, wherein an opening is defined in one end of the first outer cylinder, the driver comprises a transmission slot disposed on one end thereof that faces the opening, the driver comprises a plurality of positioning holes surrounding the transmission slot, and a plurality of elastic latching hooks is disposed on an inner wall of the first outer cylinder and located between the opening and the transmission slot, wherein each of the elastic latching hooks is protruding from the inner wall in a radial inward direction; and an actuating unit, comprising a second outer cylinder and a transmission screw rod sheathed in the second outer cylinder, wherein the second outer cylinder comprises an insertion part disposed on one end thereof, the transmission screw rod comprises a passive end protruding from the insertion part, and a plurality of connection pieces and a plurality of positioning columns extend from the insertion part and surround the passive end;

wherein the insertion part is inserted in the opening, the passive end is engaged with the transmission slot, each of the connection pieces is correspondingly latched with each of the elastic latching hooks to longitudinally lock the driving unit and the actuating unit, and each of the positioning columns is correspondingly inserted in each of the positioning holes to limit a radial movement of the driving unit relative to the actuating unit.

2. The electric supporting rod according to claim 1, wherein each of the elastic latching hooks comprises a base part and an elastic arm, and each of the base parts is disposed in the first outer cylinder and connected to each of the elastic arms.

3. The electric supporting rod according to claim 2, wherein each of the elastic arms includes a hook part, and each of the connection pieces includes an outer reverse hook, and each of the hook parts is correspondingly hooked with each of the outer reverse hooks.

4. The electric supporting rod according to claim 1, wherein the positioning columns are spaced apart from one another.

5. The electric supporting rod according to claim 1, wherein a length of each of the positioning columns is equal to or longer than a length of each of the connection pieces.

6. The electric supporting rod according to claim 1, further comprising: a bearing adapted to sheathe the transmission screw rod.

7. The electric supporting rod according to claim 1, wherein the transmission slot includes a plurality of inner teeth, and the passive end includes a plurality of outer teeth, wherein the outer teeth correspond to the inner teeth.

8. The electric supporting rod according to claim 1, wherein the actuating unit further comprises a moveable inner cylinder, the moveable inner cylinder is moveably disposed in the second outer cylinder and engaged with the transmission screw rod, the moveable inner cylinder comprises a fasten end disposed outside the second outer cylinder, and the fasten end comprises a rotary connector.

9. The electric supporting rod according to claim 1, wherein the first outer cylinder has a connection part, the connection part is disposed on an end of the first outer cylinder opposite to the opening, and the connection part comprises a connector.

* * * * *